(12) United States Patent
Schmidt

(10) Patent No.: US 8,414,997 B2
(45) Date of Patent: Apr. 9, 2013

(54) ABSORBENT INSERT FOR FOODSTUFF PACKAGING

(75) Inventor: Andreas Schmidt, Duderstadt (DE)

(73) Assignee: McAirlaid's Vliesstoffe GmbH & Co. KG, Steinfurt (DE)

( * ) Notice: Subject to any disclaimer, the term of this patent is extended or adjusted under 35 U.S.C. 154(b) by 0 days.

(21) Appl. No.: 11/995,239

(22) PCT Filed: Jul. 6, 2006

(86) PCT No.: PCT/DE2006/001166
§ 371 (c)(1),
(2), (4) Date: Jan. 10, 2008

(87) PCT Pub. No.: WO2007/006272
PCT Pub. Date: Jan. 18, 2007

(65) Prior Publication Data
US 2008/0190786 A1    Aug. 14, 2008

(30) Foreign Application Priority Data
Jul. 12, 2005  (DE) .......................... 10 2005 032 432

(51) Int. Cl.
*B65D 81/26* (2006.01)

(52) U.S. Cl. ............................ 428/68; 206/204; 426/126
(58) Field of Classification Search .................... 428/68; 426/126; 206/204
See application file for complete search history.

(56) References Cited

U.S. PATENT DOCUMENTS

| 4,935,282 A | * | 6/1990 | Pawlowski et al. | ............ 428/121 |
| 6,447,826 B1 | * | 9/2002 | Matthews | ..................... 426/126 |
| 2002/0187331 A1 | | 12/2002 | Shibata et al. | |
| 2003/0108646 A1 | | 6/2003 | O'Connor | |
| 2004/0226834 A1 | | 11/2004 | Baldwin et al. | |

FOREIGN PATENT DOCUMENTS

| DE | 202 00 661 U1 | 3/2002 |
| DE | 10301171 A1 * | 7/2003 |
| WO | WO 9320950 A1 * | 10/1993 |

* cited by examiner

*Primary Examiner* — Brent O'Hern
(74) *Attorney, Agent, or Firm* — Gudrun E. Huckett

(57) ABSTRACT

An absorbent insert has an upper cover layer, a lower cover layer, and an absorption layer for liquids, wherein the absorption layer is positioned between the upper and lower layers. At least one of the two cover layers is a film and has a three-dimensional structure and liquid-permeable openings. The absorbent insert is sealed at least partially along outer edges of the absorbent insert.

29 Claims, 2 Drawing Sheets

ABSORBENT INSERT FOR FOODSTUFF PACKAGING

BACKGROUND OF THE INVENTION

The present invention concerns an absorbent insert, in particular, an absorbing absorbent insert for foodstuff packaging, comprised of an upper cover layer, a lower cover layer as well as an absorption layer arranged between the two cover layers. The present invention moreover concerns a method for producing the absorbent insert as well as its use as laminate insert for foodstuff packaging.

Laminate inserts for foodstuff packaging are known. They are provided to ensure a clean separation between the foodstuff, in particular, fresh meat from which meat juices can leak, and the packaging. The known laminate inserts comprise an absorption layer that contains generally a super absorbent plastic material in order to absorb the leaking liquids, to convert it into a gel and to retain it within the interior of the laminate insert. WO 90/03320 discloses an insert for meat and poultry products into which an absorber is incorporated. The absorber comprises top and bottom layers of plastic material, at least one being perforated, and an intermediate layer that is arranged between the two other layers. The central absorber layer contains a plurality of non-directional and overlapping fibers of absorption material and contains granules of super absorber distributed therein. The granules are secured within this layer of fiber material against displacement and sliding and remain in this position even when liquid has been absorbed. The top and bottom layers of plastic film are at least partially connected to one another at least along their oppositely positioned edges in order to hold the absorber layer between the top and bottom layers.

In German patent application 103 01 171 A1 a further absorbent laminate insert for foodstuff packaging, in particular, meat packaging is disclosed. The insert is comprised of two film layers of a thermoplastic synthetic material, of which at least the upper film layer is perforated, and comprised of at least one absorption layer that is positioned between the film layers and is essentially comprised of nondirectional laid pulp fibers with particles of a super absorbent material. The perforations converge from the exterior to the interior of the laminate insert. At the base of the perforation the pulp fiber layer is greatly compressed, the pulp fibers are fused by pressure at the base of the perforation without a binder.

Conventionally, fresh meat is placed with intermediate positioning of the absorbent insert on a support, a so-called self-service meat plate or a so-called tray. The absorbent insert has the task of absorbing the liquid that leaks without pressure and suction forces from the meat. However, the meat should not be actively drained because it would then dry out and flaws similar to freezer burn would result. On the other hand, any leaking of liquid and absorption material from the insert in the direction of the fresh meat or the stored goods should be prevented.

The absorbent inserts known from the prior art often exhibit the disadvantage.
  that the liquid that is leaking from the fresh meat is absorbed more or less badly as a result of its composition;
  that the perforation openings in the cover film will plug quickly because of the meat juices;
  that the meat will cover tightly the inlet openings for the meat juices in case of smooth surfaces so that in this way absorption is greatly impaired and/or prevented;
  that no super absorbent granules can be used because of the open cut edges;
  that the pressure caused by the weight of the meat when resting on the insert causes at these contact locations more liquid to be absorbed (so-called wick effect) than would be the case when the meat would be contacting "pressureless" the absorbent body of the insert this can easily lead to the meat drying out.

The present invention has thus the object to provide absorbent inserts that will solve the aforementioned usual problems, that are particularly suitable as inserts for foodstuff packaging for absorbing liquids leaking from fresh meat, fish, poultry and fruits so that the foodstuff must not lie in the leaked liquid; however it is to be prevented that more liquid than the amount that will leak from the foodstuff without weight-caused pressure will be absorbed which would lead to the food stuff drying out. It is therefore primarily an object of the present invention to provide an absorbent insert of the aforementioned kind which absorbs liquid independent of the weight-caused pressure of the goods, which however at points where the foodstuff or the meat has direct contact will absorb only the liquid that leaks by itself. An active water removal from the meat is to be prevented by constructive means and a safe handling of the super absorbent granules is to be ensured by constructive means.

SUMMARY OF THE INVENTION

The absorbent insert in accordance with the present invention is characterized in that at least one of the two cover layers is a film and has a three-dimensional structure and liquid-permeable openings and in that the absorbent insert is at least partially sealed at its outer edges.

The absorbent insert according to the invention has the advantage that the foodstuff resting on this insert rests primarily on areas and exerts such weight-caused pressure which areas project in the direction of the foodstuff or the goods to be placed thereon i.e. on raised portions. The leaking liquid can pass through the permeable openings in the direction of the absorption layer and is absorbed by it only then. Preferably, the cover layer is stiffened such that it counteracts the weight-caused pressure of the meat with a maximum of stability against deformation.

In one possible embodiment of the present invention, the upper cover layer is a film. The three-dimensional structure is configured in the cover layer preferably such that the film has depressions that are oriented inwardly. They can be conical or pyramid-shaped in the inward direction. In this embodiment, the liquid-permeable openings are located at the bottom of the depressions, i.e., in those sections of the three-dimensional structure that is closest to the absorption layer. The openings can be located within the bottom at the center or the edge. The openings are preferably arranged exclusively at the bottom of the depressions. Preferably, the openings have the form of slots, preferably short slots, or are small dot-shaped openings. This embodiment has the advantage that, when foodstuff such as meat is resting on the absorbent insert, the leaking liquid will collect in the depressions and pass through the permeable openings at the bottom of these depressions into the absorption layer. At the locations where the foodstuffs rests completely on the absorbent insert, i.e., exerts pressure thereon that is so great that the film will deform, these three-dimensional structures will be compressed at points which, at the same time, causes the liquid-permeable openings to close similar to a valve lip. For the foodstuff to be stored, this embodiment has the advantage that liquid leaking without pressure will be absorbed immediately while in the areas with great pressure exertion on the absorption layer the openings will close so that no significant additional amount of liquid will be absorbed. Logically, from a surface that is covered at points in this way no product liquid will leak anymore. In this way, in these proximal areas, i.e., where the meat is very close to the absorption core and where usually water is actively removed in the case of a simple perforated film, there are no openings present anymore or these openings have been reduced to a very small size. Furthermore, by closing the openings, a migration of components from the absorption core outwardly in the direction of the meat is extremely minimized or even prevented.

The upper cover layer is preferably selected from a stretchable and/or thermally deformable material available in the form of films, preferably made of thermoplastic synthetic material. Such synthetic materials can be polyolefins such as polyethylene of high-density, medium-density or low-density, polypropylene of high-density, medium-density, or low-density, polyethylene terephthalate, diverse copolymers of these materials or also co-extruded materials thereof. Also suitable and excellently processable are biodegradable films.

The upper cover layer is preferably arranged on the side of the absorbent insert according to the invention that is facing the foodstuff. In the following, this side will be referred to as top side.

The lower cover layer that is arranged at the bottom side of the absorbent insert, i.e., on the side that is facing away from the foodstuff can be made of any suitable material that has covering properties. Preferably, this further film layer at the bottom side of the absorbent insert is made of the same material as the film layer of the top side or of a nonwoven material made of plastic material or pulp fibers.

For different applications, for example, pre-tailored individual pads for meat trays it has been found to be advantageous to provide both sides with the same modified film. When both sides are identical, the time-consuming orientation of the products when placing them into the packaging is no longer required.

According to the invention, the two film layers are at least partially sealed at their outer edges. Preferably, they are connected along the outer edges with one another. Such a configuration prevents that material from the absorption layer will laterally escape and come into contact with the foodstuff. In one possible embodiment only the film layers are connected to one another, preferably welded to one another, without the absorption layer being included. In this embodiment, the absorption layer is essentially completely enveloped by the two film layers. In this embodiment, a relatively soft product is obtained that can slide within the film envelope.

In another embodiment, the edges of the absorption layer are engaged when connecting the film layers. In this way, a relatively hard and stiff product is obtained because the absorption layer cannot slide within the envelope.

According to a further embodiment, the layers are additionally connected to one another across their surface areas by means of adhesives such as hot melt, cold glue etc. In this way, a relatively stiff product with at least partially closed-off and sealed edge areas will result wherein the product itself has a sandwich character. The absorption layer which is arranged between the two film layers is preferably selected from a nonwoven or woven material of plastics or cellulose. Well absorbing nonwoven materials of cellulose are preferred. So-called airlaid nonwovens or tissue papers have been found to be especially well suited as absorption layers. For increasing the absorption capacity of the absorption layer, superabsorbent materials are preferably incorporated in the absorption materials. These superabsorbent materials are preferably homogeneously distributed in the absorption layer so that a uniform absorption of liquid is ensured. When airlaid nonwovens are used in combination with superabsorbent materials as an absorption layer, these superabsorbers are generally directly mixed with the initial fibers for the airlaid method so that these superabsorbers are simultaneously secured by the fibers in the airlaid nonwoven. These superabsorbent materials can be selected from any suitable superabsorbent; usually, they are selected from polymers of crosslinked polyacrylic acid, carboxymethylcellulose (CMC), pectins or gelatins.

In a further embodiment, for increasing the absorption capacity in the absorption layer, superabsorbent materials are strewn or glued in layers between layers of tissue paper or nonwoven.

The absorption layer can also contain substances that produce carbon dioxide when exposed to water, in particular, a mixture of carbonates and acids such as carbonate or bicarbonate and citric acid. Additives can also be contained that absorb oxygen and/or odorous compounds and/or inhibit growth of bacteria and/or mold.

According to a further embodiment of the invention, above and below the absorption layer there are one or several nonwoven fabrics or similar layers arranged or the absorption layer is coated with such fabrics. By means of these fabrics the blocking effect when pressure is exerted on the absorbent insert is significantly improved.

The absorbent insert can be tailored as individual inserts or can be present in the form of a single-layer or multi-layer product web wherein the individual absorbent inserts are connected to one another by perforations or other weakened sections. In a further configuration of this embodiment, the product web is placed into a packaging in a zigzag arrangement wherein the ends of the absorbent insert are connected to one another, respectively.

A further object of the present invention is a method for producing an absorbent insert in which an absorption layer having the desired absorbent size is covered on both sides with cover layers, wherein the upper cover layer is comprised of a water-impermeable material and has a three-dimensional structure and wherein the cover layers are at least partially sealed at their outer edges thermally or by pressure.

According to another possible method for producing the absorbent insert according to the invention, an absorption layer having the desired absorbent size is covered on both sides with film layers, the upper cover layer is provided with a three-dimensional structure, and the cover layers are at least partially sealed at the outer edges thermally or by pressure.

Preferably, in a first method step the absorption layers are produced and cut to the desired absorbent size. Subsequently, the cover layers for forming the top side and the bottom side of the absorbent insert are supplied. When no pre-structured cover layer is used, in the subsequent method steps the top side and optionally also the bottom side is provided with a three-dimensional structuring of the film and the outer edges are connected to one another, preferably are welded to one another. Structuring of the film can be realized thermally and/or by mechanical stretching. In one possible configuration, the blank of the absorbent insert composed already of three layers is passed through a further layer wherein at least one of the rollers is embodied as an embossing roller so that depressions are pressed downwardly into the film material. The openings can be applied by conventional cutting tools. In a way known in the art, as a modification on the embossed pattern, or by means of cold needling or hot needling or point-wise overstretching of the film. In a preferred embodiment, the embossing rollers that are preferably utilized for structuring have cutting edges on their structure that produce simultaneously openings of the desired size and shape in the films when structuring.

As already described above, the individual absorption inserts can be present in the form of product webs. Connecting the individual absorbent inserts to product webs can be realized by means of thermal or mechanical sealing processes or by means of pressure-sensitive adhesives.

In a final step, the product webs can be wound to rolls or coils. Another product variant is a layered web material stack.

The absorbent insert according to the invention, as already described, can be utilized for foodstuff packaging, in particular for fresh meat, seafood, poultry and fruits. They are used primarily for insertion into trays of liquid-impermeable plastic material wherein the absorbent insert according to the invention can either be placed loosely, sealed or glued into the trays. Moreover, it is suitable as an absorbent insert in large sizes for large transport packaging, for example, air transport containers for seafood; meat, poultry and fruits.

BRIEF DESCRIPTION OF THE DRAWINGS

Embodiments of the present invention will be explained in the following with the aid of the drawings. It is shown in.

DESCRIPTION OF PREFERRED EMBODIMENTS

Figure 1:
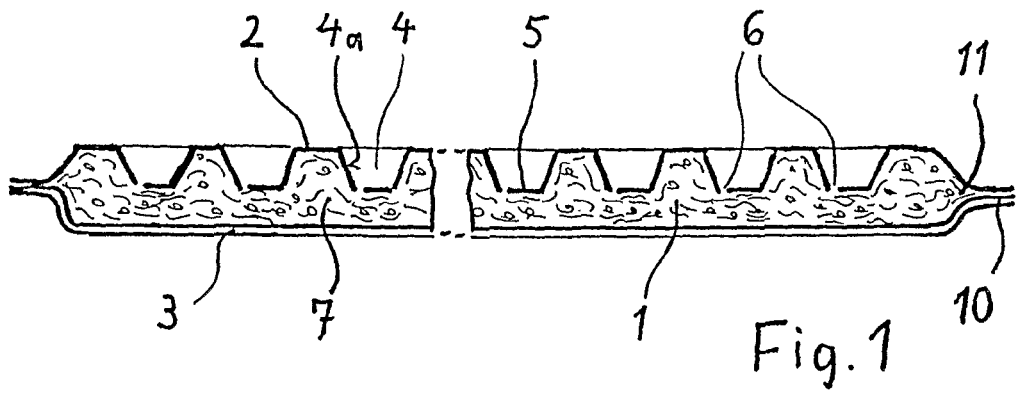
FIG. 1 a side view of the first embodiment of the invention.
Figure 3:
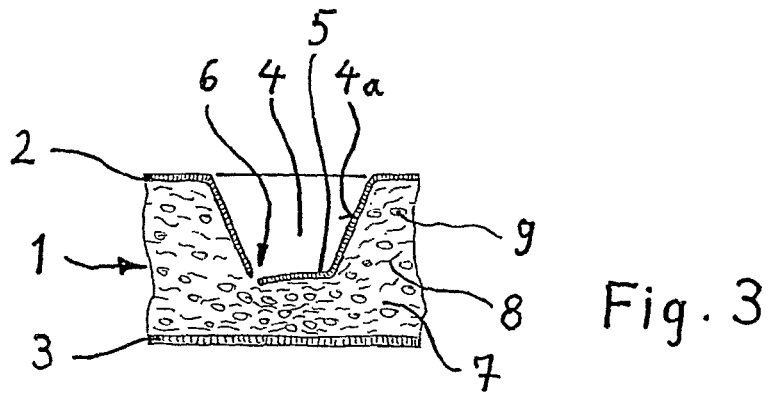
FIG. 3 a cross-section of a depression.
Figure 4:
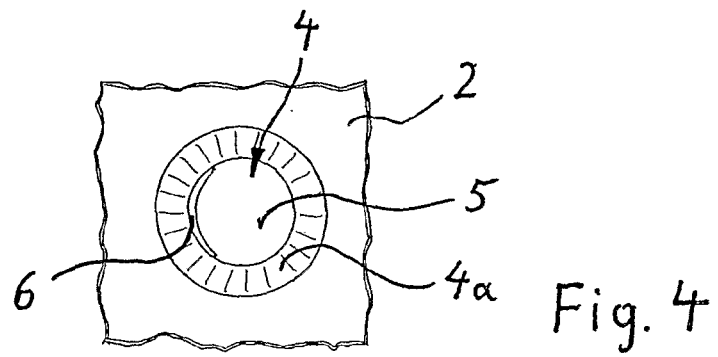
FIG. 4 a plan view onto a depression.

FIGS. 1, 3 and 4 illustrate an absorbent insert 1 comprising an upper film layer 2 and a lower film layer 3. The upper film layer 2 has a three-dimensional structure according to which the film comprises a plurality of uniformly distributed depressions 4 in the inward direction. In the illustrated embodiment, the walls 4a of the depressions 4 extend conically in the inward direction. On the flat bottom 5 of the depressions 4 there are openings 6 through which the liquid to be absorbed passes in the direction toward the absorption layer 7. The openings 6 are slots because such slots will close already upon minimal compression of the film 2. The slots are provided according to FIGS. 3 and 4 near the edge of the bottom 5.

The absorption layer 7 comprises nondirectional fibers 8 illustrated as squiggles as well as granules 9 made of super absorbent material.

In the embodiment according to FIG. 1 and FIG. 3 the lower film layer 3 is smooth i.e., not structured, that is, flat; in other words: two-dimensional. The upper and the lower film layers 2 and 3 are connected to one another in the embodiment illustrated in FIG. 2 without the absorption layer 7 being included also. The film layers 2 and 3 form an envelope for the absorption layer 7 in which envelope the absorption layer can slide depending on the size of the envelope. In this way, a relatively soft product is produced.

Figure 2:
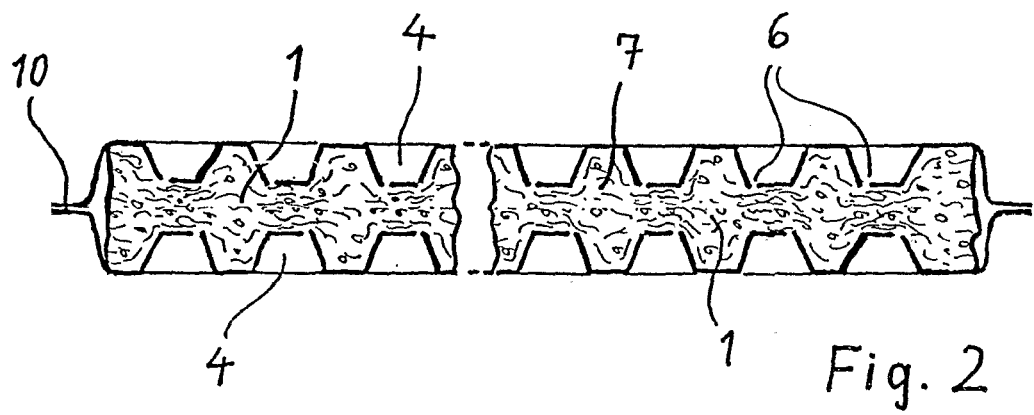
FIG. 2 a side view of another embodiment.

In FIG. 2 a further embodiment of the absorption layer 1 according to the invention is illustrated. The absorbent insert has again an upper film layer 2 and a lower film layer 3. In the illustrated embodiment, the two film layers 2, 3 are structured three-dimensionally. They both have inwardly extending depressions 4 having at their bottom 5 preferably slot-shaped openings 6 for liquids to be absorbed.

In the embodiment illustrated in FIG. 1 the film layers 2 and 3 are connected to one another at their outer edges 10 in such a way that the outer edge 11 of the absorption layer 7 is also engaged. In this configuration, the absorption layer 7 is enclosed in the two film layers 2, 3 so as to be almost completely protected from sliding. The embodiment illustrated in FIG. 2 in which the upper film layer 2 as well as the lower film layer 3 are three-dimensionally structured has the advantage that a thicker absorbent insert is obtained that thus provides a larger storage volume in comparison to an absorbent insert with only one structured side. A larger storage volume has the result that only minimal amounts of super absorbent material are required because these materials can absorb more liquid when a larger volume is present.

An absorbent insert according to the invention has usually between 3 and 25 depressions per square centimeter, in particular between 4 and 16 depressions. The openings can be slotted at an angle of 45 degrees to 180 degrees wherein preferably a size of 0.01 to 0.5 mm is obtained, preferably, the size is between 0.05 and 0.2 mm. The super absorbent materials, inasmuch as they are indeed provided, are generally used in the form of fibers or granules. The size of the openings and the size of the granules of the super absorbent material should be matched to one another such that the granular material in the dry state cannot fall through the openings. In any case, contact of the granular material with the foodstuff is to be prevented.

Figure 5:
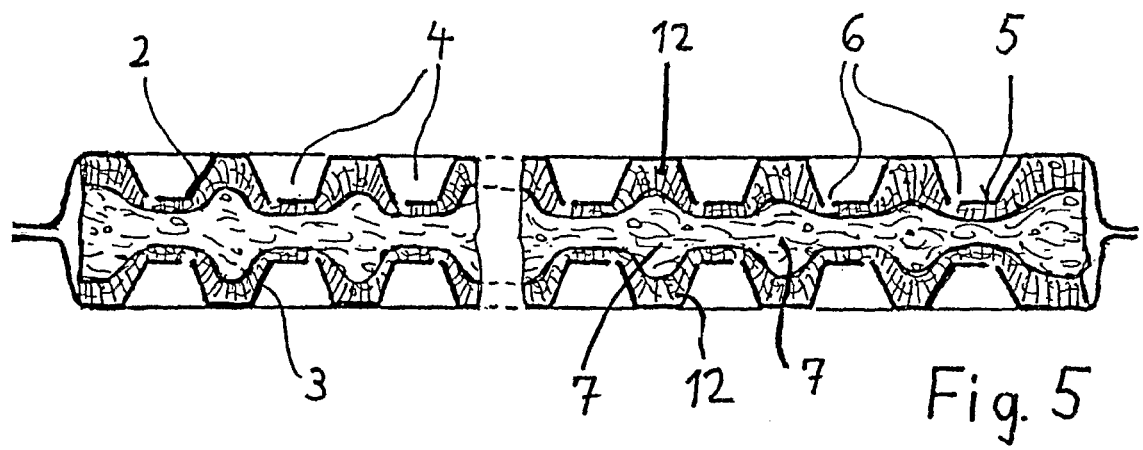
FIG. 5 a side view of a third embodiment of the present invention.

In FIG. 5 a third embodiment of the present invention is illustrated. The absorbent insert 1 according to the invention has two film layers 2, 3 with three-dimensional structure. The absorption layer 7 in the illustrated embodiment is coated at the top side as well as its bottom side with a nonwoven 12. This nonwoven does not impair the permeability for the liquid to be absorbed, but improves the closing effect of the openings 6 as soon as pressure is exerted on the absorbent insert 1. When pressure is exerted on the absorbent insert 1, for example, in the direction of the absorption layer 7, the bottom 5 of the depression will contact with its opening 6 the nonwoven 12 so that the opening 6 will immediately close.

In FIG. 3 a cross-section of the depression 4 with opening 6 is illustrated. The depression 4 extends conically in the inward direction. The opening 6 in the illustrated embodiment is provided at the bottom of the depression.

A further effect can be observed when the volume of the absorption layer 7 as a result of absorption of liquid increases such that from the interior pressure is exerted onto the openings 6 so that this will also cause closure of these openings. In this case the effect is further enhanced by a nonwoven 12.

Figure 6:
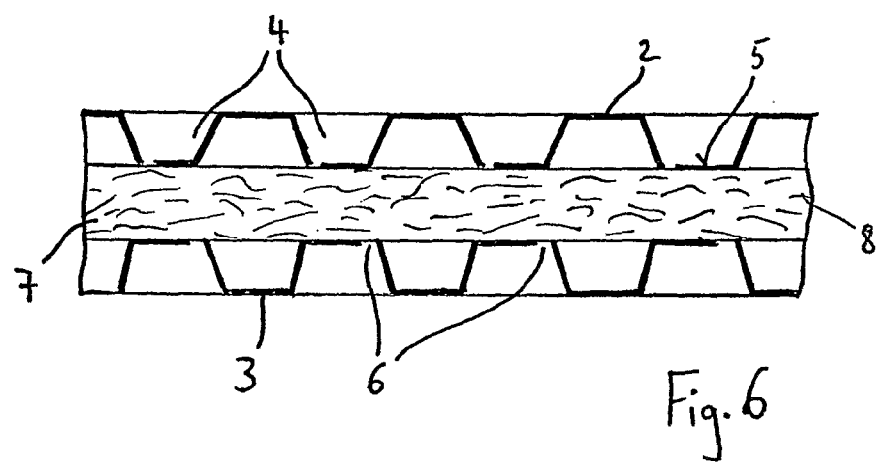
FIG. 6 a side view of a fourth embodiment of the present invention.

In FIG. 6 an embodiment of the absorbent insert 1 according to the invention is illustrated partially with two three-dimensionally surface-structured layers 2, 3 in a side view. In contrast to the preceding embodiment: the absorption layer 7 in this embodiment has substantially plane top and bottom sides, i.e., the space between the depressions 4 does not contribute to the absorption action. The absorption layer 7 is comprised of fibers 8 that are positioned like a cellulose layer or like a nonwoven between the depressions 4.

LIST OF REFERENCE NUMERALS 1 absorbent insert
2 upper film layer
3 lower film layer
4 depression
4a wall of the depression 4

5 bottom of the depression
6 opening slot
7 absorption layer
8 fiber
9 super absorbent material
10 outer edge of film layer 2, 3
11 outer edge of absorbent layer 7
12 nonwoven

What is claimed is:

1. An absorbent insert comprising:
an upper cover layer;
a lower cover layer;
an absorption layer for liquids which absorption layer is positioned between the upper and lower cover layers;
wherein the upper cover layer is a film and has a three-dimensional structure and liquid-permeable openings, wherein the film is comprised of a stretchable thermoplastic synthetic material;
wherein the three-dimensional structure comprises depressions provided in the film and wherein the depressions extend in a direction toward the absorption layer, wherein the depressions have a bottom with a circumferential edge;
wherein the liquid-permeable openings are located exclusively at the circumferential edge of the bottom of the depressions;
wherein the depressions are compressed when pressure that causes the film to deform is applied from above onto the upper cover layer and the liquid-permeable openings are closed;
wherein the absorbent insert is sealed at least partially along outer edges of the absorbent insert.

2. The absorbent insert according to claim 1, wherein the depressions taper inwardly in a cone shape or a pyramid shape.

3. The absorbent insert according to claim 1, wherein the liquid-permeable openings are slots.

4. The absorbent insert according to claim 1, wherein the liquid-permeable openings are produced by cold needling or by hot needling or by point-wise overstretching of the film.

5. The absorbent insert according to claim 1, wherein the thermoplastic synthetic material is selected from the group consisting of low-density polyethylene, medium-density polyethylene, high-density polyethylene, low-density polypropylene, medium-density polypropylene, high-density polypropylene, copolymers of different polyolefins, polyethylene terephthalate, and co-extruded synthetic materials of the afore-listed thermoplastic synthetic materials.

6. The absorbent insert according to claim 1, wherein the film is biodegradable.

7. The absorbent insert according to claim 1, wherein the lower cover layer and the upper cover layer are comprised of identical material.

8. The absorbent insert according to claim 1, wherein the lower cover layer is a nonwoven of a synthetic material or of a cellulose material.

9. The absorbent insert according to claim 1, wherein the cover layers have outer edges that are connected to one another along their outer edges.

10. The absorbent insert according to claim 9, wherein the absorption layer is included in a seam where the outer edges of the cover layers are connected.

11. The absorbent insert according to claim 1, wherein the absorption layer is selected from nonwoven synthetic material, nonwoven cellulose material, synthetic fabric material, or cellulose fabric material.

12. The absorbent insert according to claim 11, wherein the absorption layer is an airlaid nonwoven or a tissue paper.

13. The absorbent insert according to claim 1, wherein the absorption layer contains superabsorbent materials.

14. The absorbent insert according to claim 13, wherein the superabsorbent materials are made from cross-linked polyacrylic acid, carboxy methyl cellulose, pectins or gelatins.

15. The absorbent insert according to claim 14, wherein the absorption layer has additives that, when exposed to water, generate carbon dioxide.

16. The absorbent insert according to claim 15, wherein the additives are a mixture of carbonates and acid.

17. The absorbent insert according to claim 15, wherein the additives are a mixture of citric acid and carbonate or bicarbonate.

18. The absorbent insert according to claim 14, wherein the absorption layer contains at least one additive of the group consisting of an oxygen-absorbing additive, an odorous compound-absorbing additive, a bacterial growth-inhibiting additive, a mold growth inhibiting additive, and an additive inhibiting growth of bacteria and mold.

19. The absorbent insert according to claim 1, wherein the absorption layer is coated on one face or both faces with a nonwoven or a tissue.

20. The absorbent insert according to claim 1 in the form of a single-layer or multi-layer product web comprised of individual absorbent inserts that are connected to one another.

21. The absorbent insert according to claim 20, wherein the product web is placed into a packaging and the ends are connected to one another.

22. The absorbent insert according to claim 1 as an insert for foodstuff packaging.

23. The absorbent insert according to claim 1, wherein the lower cover layer is a film and has a three-dimensional structure and liquid-permeable openings.

24. The absorbent insert according to claim 23, wherein the film is a thermoplastic synthetic material that is selected from the group consisting of low-density polyethylene, medium-density polyethylene, high-density polyethylene, low-density polypropylene, medium-density polypropylene, high-density polypropylene, copolymers of different polyolefins, polyethylene terephthalate, and co-extruded synthetic materials of the afore-listed thermoplastic synthetic materials.

25. The absorbent insert according to claim 23, wherein the film of the lower cover layer is stretchable.

26. A method for producing an absorbent insert according to claim 1, the method comprising the steps of:
covering an upper face and a lower face of an absorption layer that has a selected absorbent size with an upper cover layer and a lower cover layer, respectively, wherein the upper cover layer is comprised of a water-impermeable material and has a three-dimensional structure; and
sealing thermally or by pressure outer edges of the upper and lower cover layers at least partially.

27. The method according to claim 26, wherein the three-dimensional structure is produced thermally or mechanically.

28. A method for producing an absorbent insert according to claim 1, the method comprising the steps of:
covering an upper face and a lower face of an absorption layer that has a selected absorbent size with an upper film cover layer and a lower film cover layer, respectively;
producing a three-dimensional structure in the upper film cover layer;
sealing thermally or by pressure outer edges of the upper and lower film cover layers at least partially.

29. The method according to claim 28, wherein the three-dimensional structure is produced thermally or mechanically.

\* \* \* \* \*

UNITED STATES PATENT AND TRADEMARK OFFICE
CERTIFICATE OF CORRECTION

| | |
|---|---|
| PATENT NO. | : 8,414,997 B2 |
| APPLICATION NO. | : 11/995239 |
| DATED | : April 9, 2013 |
| INVENTOR(S) | : Andreas Schmidt |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 767 days.

Signed and Sealed this
Twenty-sixth Day of May, 2015

Michelle K. Lee
*Director of the United States Patent and Trademark Office*